United States Patent
Joshi

(10) Patent No.: US 10,901,883 B2
(45) Date of Patent: Jan. 26, 2021

(54) EMBEDDED MEMORY MANAGEMENT SCHEME FOR REAL-TIME APPLICATIONS

(71) Applicant: Continental Automotive Systems, Inc., Auburn Hills, MI (US)

(72) Inventor: Bijal Joshi, Schaumburg, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/244,387

(22) Filed: Apr. 3, 2014

(65) Prior Publication Data

US 2014/0304485 A1     Oct. 9, 2014

Related U.S. Application Data

(60) Provisional application No. 61/809,031, filed on Apr. 5, 2013.

(51) Int. Cl.
    *G06F 12/02*     (2006.01)
    *G06F 9/50*      (2006.01)
    (Continued)

(52) U.S. Cl.
    CPC ........ *G06F 12/0223* (2013.01); *G06F 3/0611* (2013.01); *G06F 9/30* (2013.01); *G06F 9/5016* (2013.01)

(58) Field of Classification Search
    None
    See application file for complete search history.

(56) References Cited

U.S. PATENT DOCUMENTS 5,008,805 A * 4/1991 Fiebig ............... G05B 9/03
                                             700/79
5,875,464 A * 2/1999 Kirk ................. G06F 12/1054
                                             711/121
(Continued)

FOREIGN PATENT DOCUMENTS

CN     101174245 A     5/2008
CN     101611387 A     12/2009
(Continued)

OTHER PUBLICATIONS

Search Report dated Jan. 14, 2014, from corresponding GB Patent Application No. GB1312999.4.
(Continued)

*Primary Examiner* — Sean D Rossiter
*Assistant Examiner* — Stephanie Wu

(57) ABSTRACT

Memory is dynamically shared or allocated in an embedded computer system. The types of memory that are part of the system are first determined. Thereafter, the amount of memory available for use is determined. The type of memory required by a program or application is determined as is the amount of space that is required. If the amount of memory space that can be allocated to the program in a first type of requested memory is greater than or at least equal to the amount of memory space required by the computer program, the program is then loaded into the available memory. If the requested type of memory is not available or there is not enough of the requested memory available, other types of memory devices are considered and used, if sufficient space in one or more of them exists.

14 Claims, 5 Drawing Sheets

(51) Int. Cl.
*G06F 3/06* (2006.01)
*G06F 9/30* (2018.01)

(56) References Cited

U.S. PATENT DOCUMENTS

| | | | |
|---|---|---|---|
| 8,718,087 B1* | 5/2014 | Johnston | H04L 12/12 370/463 |
| 2004/0098427 A1* | 5/2004 | Peng | G06F 8/665 |
| 2005/0262323 A1 | 11/2005 | Woo et al. | |
| 2007/0011420 A1 | 1/2007 | Boss et al. | |
| 2007/0180203 A1 | 8/2007 | Ramgarajan et al. | |
| 2008/0016303 A1 | 1/2008 | Okumoto et al. | |
| 2008/0016308 A1 | 1/2008 | Bartley et al. | |
| 2008/0196030 A1* | 8/2008 | Buros | G06F 9/5033 718/102 |
| 2008/0201716 A1 | 8/2008 | Du et al. | |
| 2010/0131698 A1* | 5/2010 | Tsai | G06F 12/023 711/103 |
| 2011/0145609 A1* | 6/2011 | Berard | G06F 1/3203 713/320 |
| 2011/0161597 A1* | 6/2011 | Tremaine | G06F 12/0895 711/133 |
| 2011/0173362 A1* | 7/2011 | Kardashov | G06F 9/5077 710/264 |
| 2012/0215975 A1* | 8/2012 | Catrouillet | G06F 9/24 711/105 |
| 2012/0271903 A1 | 10/2012 | Luna | |
| 2013/0138886 A1* | 5/2013 | Yamauchi | G06F 9/544 711/120 |
| 2014/0215177 A1* | 7/2014 | Kim | G06F 12/06 711/171 |
| 2015/0178204 A1* | 6/2015 | Ray | G11C 5/04 711/103 |

FOREIGN PATENT DOCUMENTS

| | | |
|---|---|---|
| CN | 102508787 A | 6/2012 |
| CN | 102667739 A | 9/2012 |

OTHER PUBLICATIONS

International Search Report and Written Opinion dated Jun. 30, 2014, from corresponding International Patent Application No. PCT/US2014/032529.

* cited by examiner

EMBEDDED MEMORY MANAGEMENT SCHEME FOR REAL-TIME APPLICATIONS

BACKGROUND

As used herein, the term, "embedded system" refers to a computer system, which is designed to perform control functions within, or for, another and usually larger system. Because such a computer system is usually a component part of the larger system it is thus referred to as being "embedded" in the larger system. For example, a computer system that controls the various components of a vehicle "infotainment" system is considered herein to be an embedded system. A computer system that controls components of a cell phone is considered herein to be an embedded system. General-purpose computers on the other hand, such as a personal computer or "PC" and which are not connected to or form part of a larger system are not embedded systems.

Many embedded systems are required to be able to run many different types of applications or programs at the same time or essentially the same time. Many embedded systems also employ different types of physical memory devices to reduce cost yet optimize the execution of different programs with correspondingly different levels of importance. The types of memory devices that such systems might use can include IRAM (internal RAM, which is located on the same semiconductor die as a processor) and external RAM devices such as DDR1, DDR2, SDRAM, FLASH or even a hard disk drive.

Each type of RAM will have a different access time, i.e., the rate at which data can be written to and read from a location in a device. IRAM is usually the fastest with the locations therein being accessible at the same clock speed as the CPU. FLASH ram on the other hand is usually the slowest.

The number of CPU clock cycles needed to write data to and read data from different types of RAM devices can become key contributors to how a program that is to be run on an embedded computer system, i.e., an embedded application, will actually perform on the system. Since relatively fast RAM devices are usually more expensive than relatively slow RAM devices, many embedded computer systems are designed to reduce cost by using a relatively small amount of fast RAM in combination with a larger amount of slow RAM, examples of which include SDRAM and FLASH memory.

In an embedded system that has to run different programs, the programs that need to be executed quickly are usually allocating data into the fastest memory devices, examples of which are memory devices and locations on the same semiconductor die as the CPU or processor. Less-important programs or those which do not need to be executed quickly are often allocating data into relatively slow memory devices, which are usually memory devices external to the CPU or processor or which are made using inherently slower technologies. So-called DDR2 memory devices have shorter access times and are thus faster than SDRAM devices. SDRAM devices can have shorter access times and thus be faster than a magnetic disk, i.e., a hard disk drive, configured and operated as a random access memory.

Optimally sharing different types of memory space available to store program data for different programs that have different execution priorities can be a crucial task for embedded computer systems. As the number of tasks that an embedded computer system must perform increases, optimal use of memory space becomes more critical.

FIG. 1 is a simplified block diagram of a prior art embedded computer system 100. A semiconductor substrate 102 is formed to have a central processing unit or CPU 104 and several individually-addressable random access memory (RAM) locations 106, using techniques well-known to those of ordinary skill in the semiconductor art. The addresses of the on-chip RAM 106 locations are shown as being numbered from zero to one-thousand (decimal) for illustration purposes. A DDR2 random access memory (RAM) device 108 and an SDRAM device 110 are external to the die 102 but are accessed via the same conventional bus 112. The bus 112 also couples the CPU 104 to various different peripheral devices 114 that the CPU 104 is required to control.

Since the on-chip RAM locations 106 are on the same semiconductor die 102 as the CPU 104 and certainly closer to the CPU 104 than other external memory devices 108, 110, the CPU 104 is able to access the on-chip memory locations 106 in significantly less time than it takes the CPU 104 to access memory devices external to the CPU 104, i.e., DDR2 108 and SRAM 110. Programs that need to be accessed quickly are therefore preferably stored in and executed from the on-chip RAM locations 106.

Those of ordinary skill in the art know that different peripheral devices 114 controlled by the CPU 104 might require different responsiveness from the CPU 104. In the prior art, when a computer program is written to control a particular peripheral device 114, the program can be written to include a compiler directive or "pragma" which when compiled will enforce a memory map that will instruct a memory manager 114 where to load the data sections in memory. Such a compiler directive is commonly known as a memory allocation function or "malloc(arg)" where the argument specifies both the size and type of memory device where the following program instructions are to be loaded by the memory manager 114.

In the statements (1), (2) and (3) below, both performance critical and non-critical memories are allocated by the compiler by using the same malloc function but changing the function's argument. Corresponding data allocation will be loaded into correspondingly different physical memory devices.

$$pSlow=malloc(sizeof(rtSlowArray)); \qquad (1)$$

$$pFast=malloc(sizeof(rtFastArray)); \qquad (2)$$

$$pSlow2=malloc(sizeof(nrtSlowArray)); \qquad (3)$$

where, pSlow, pFast and pSlow2 are addresses or pointers to locations in memory device. For illustration purposes, the "rtSlowArray" generates an allocation of a relatively slow or non real-time block of memory that would be appropriate for a program that does not require CPU-intensive computation. The argument "rtFastArray" generates an allocation of fast memory that would be appropriate for a program that requires CPU intensive computations. The argument, "nrtSlowArray" would generate an allocation of slow memory, which would be appropriate for non real-time applications. Unfortunately, when a compiler directive requires a particular program to be loaded into a particular type of memory device, space for the program must be available in the compiler-directed memory device or the data section requested by the program will not be loaded by the system's memory manager 114.

FIG. 2 is a flow chart of a prior art method by which a prior art memory manger 114 for the embedded computer system 100 allocates memory space for a program responsive to the memory function, malloc. The method 200 shown in FIG. 2 is quite simple. When the instructions generated by the malloc function are executed, they effectively asks the memory manager 114 at step 202 to determine whether a block of memory of a required size is available for use by the particular program in a default memory device; usually SDRAM. If the required memory size is available, the memory is allocated at step 204 and a pointer to the starting location returned at step 206. If the required size of the space is not available in the required default memory device, the data section requested by the program will not be loaded; it will not be run.

In order to insure that a program will be loaded, a sufficient amount of memory must therefore be provided. A prudent system designer or integrator must therefore provide enough memory of various types in order to be able to accommodate all of the programs that might theoretically be run at the same time, even if such a requirement might never happen.

The cost to provide high speed memory that might never be required could be avoided if it were possible to dynamically allocate memory in different physical devices in an embedded system. A method and apparatus by which fast memory can be efficiently be shared by executable programs requiring a fast response would therefore be an improvement over the prior art.

BRIEF SUMMARY

In accordance with embodiments of the invention, memory is dynamically shared or allocated in an embedded computer system. The types of memory that are part of the system are first determined. Thereafter, the amount of memory available for use is determined. The type of memory required by a program or application is determined as is the amount of space that is required. If the amount of memory space that can be allocated to the program in a first type of requested memory is greater than or at least equal to the amount of memory space required by the computer program, the program is then loaded into the available memory. If the requested type of memory is not available or there is not enough of the requested memory available, other types of memory devices are considered and used, if sufficient space in one or more of them exists.

DETAILED DESCRIPTION

High-speed memory locations in high-speed memory devices can be re-used and shared between different embedded applications as high-speed memory becomes available. An embedded memory management scheme for real-time application programs is accomplished using a dynamic memory allocation. Dynamic memory allocation is accomplished by using a dynamic memory manager and controlling the manger to first determine the types of memory devices that are available for allocation to programs and the amount of space that is available for allocation in each type of memory device. As real time programs are called or required by the embedded system or different peripheral devices, the dynamic memory manager determines the type of memory device that will be required by a particular computer program and the amount of memory space required by the program. It also determines the space that is actually available in a particular type of memory device required by the program and that can be allocated to the program for use by the computer program. If the amount of memory space that can be allocated to a particular program in a particular type memory devices is greater than or equal to the amount of memory space required by the computer program, the dynamic memory manager loads the computer data requested by the program into the required type of memory devices and enables the computer or CPU to execute the program using data from the memory device.

Unlike the static memory allocation used in prior art embedded systems, the apparatus and method disclosed herein can dynamically allocate a data section to optimum memory devices in order to provide service to a system or peripheral device to best serve the needs based on criticality of the program.

If the amount of memory space available in particular type of memory device required by a particular program is less than the amount of memory space required by the computer program, the dynamic memory manager proceeds to determine the space available in a slower or second type of memory device. If the amount of memory space available in a slower, second type of memory devices is greater than or equal to the amount of memory space required by the computer program in the faster type of memory device, the dynamic memory manager loads or allows the program to use the data from the second type memory devices. The program can then at least be executed using a somewhat slower, second type of memory device.

Figure 1:
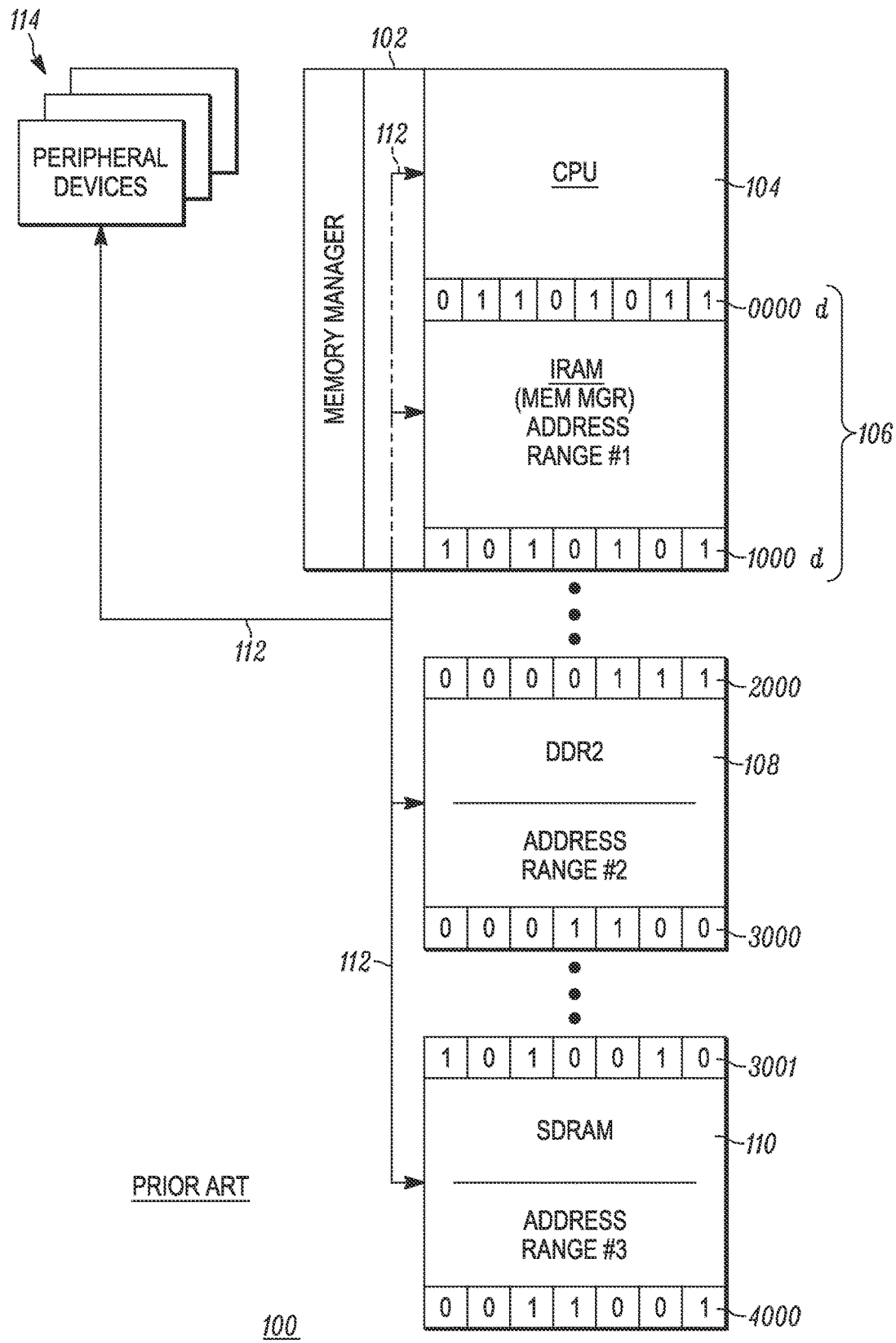
FIG. 1 is a block diagram representation of an embedded computer system having different types of memory devices, having correspondingly different access times, which store programs that control different peripheral devices coupled to the computer system.
Figure 2:
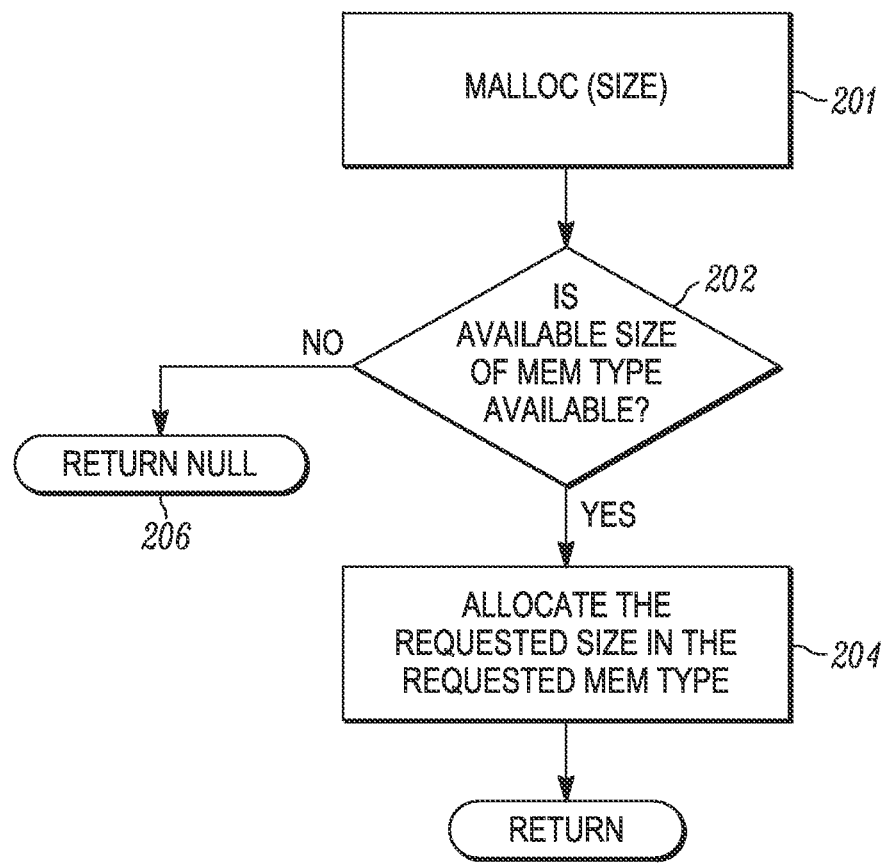
FIG. 2 is a flow chart illustrating a prior art memory allocation method.
Figure 3:
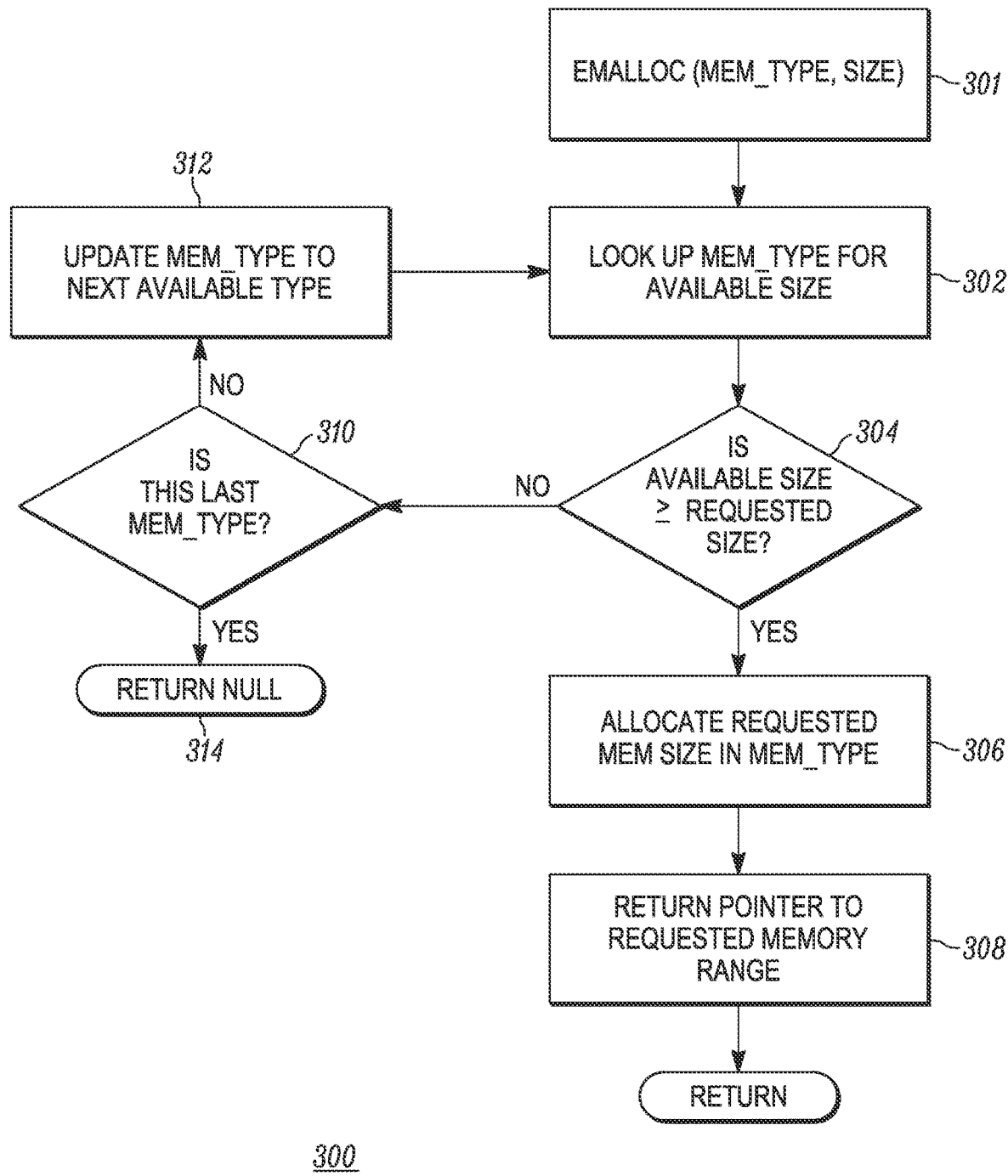
FIG. 3 is a flow chart illustrating steps of a dynamic memory allocation method.

FIG. 3 is a flow chart depicting a scheme or method of managing memory in an embedded computer system so that real time applications (programs) are able to share the type of memory device they require and possibly eliminate or reduce the amount of high-speed memory actually needed. The syntax of the "emalloc" function 301 depicted in FIG. 3 is slightly different to the syntax of a prior art malloc function. Unlike the malloc method steps depicted in FIG. 2, at step 302 a dynamic memory manager, such as the one shown in FIG. 4, first determines the various types of memory devices that comprise the embedded system. The determination performed at step 302 is preferably implemented as simply reading entries in a table, typically stored in memory.

After the types of available memory devices are determined at step 302, at step 304, the locations in a particular type of device requested in the emalloc argument, which are unused and therefore available for use by a program, are determined and compared to the amount of memory requested in the emalloc argument, i.e., the "size" parameter in the emalloc argument.

If the amount of memory specified in the emalloc argument is available in the type of memory device specified in the emalloc argument, the memory allocation requested by the program by virtue of the emalloc compiler directive is allocated by the dynamic memory manager. At step 308, the address of where the program requesting the memory block in the particular type of device is returned. The program is then loaded and executed from that memory device.

Still referring to FIG. 3, unlike prior are memory management schemes, if the test performed at step 304 fails, i.e., the memory available in a requested type of device is insufficient, or the requested memory type does not exist with the system, the method proceeds to step 310, where a determination is made whether there might be other types of memory available into which the program could be loaded and executed. If other types of memory exist, steps 312, 302 and 304 determine whether the requested amount of memory can be loaded into the next-best type of memory device, usually the next-fastest type of memory. If no other memory devices exist, the method 300 fails at step 314 and returns a null pointer, indicating that the program cannot be loaded into any memory.

Figure 4:
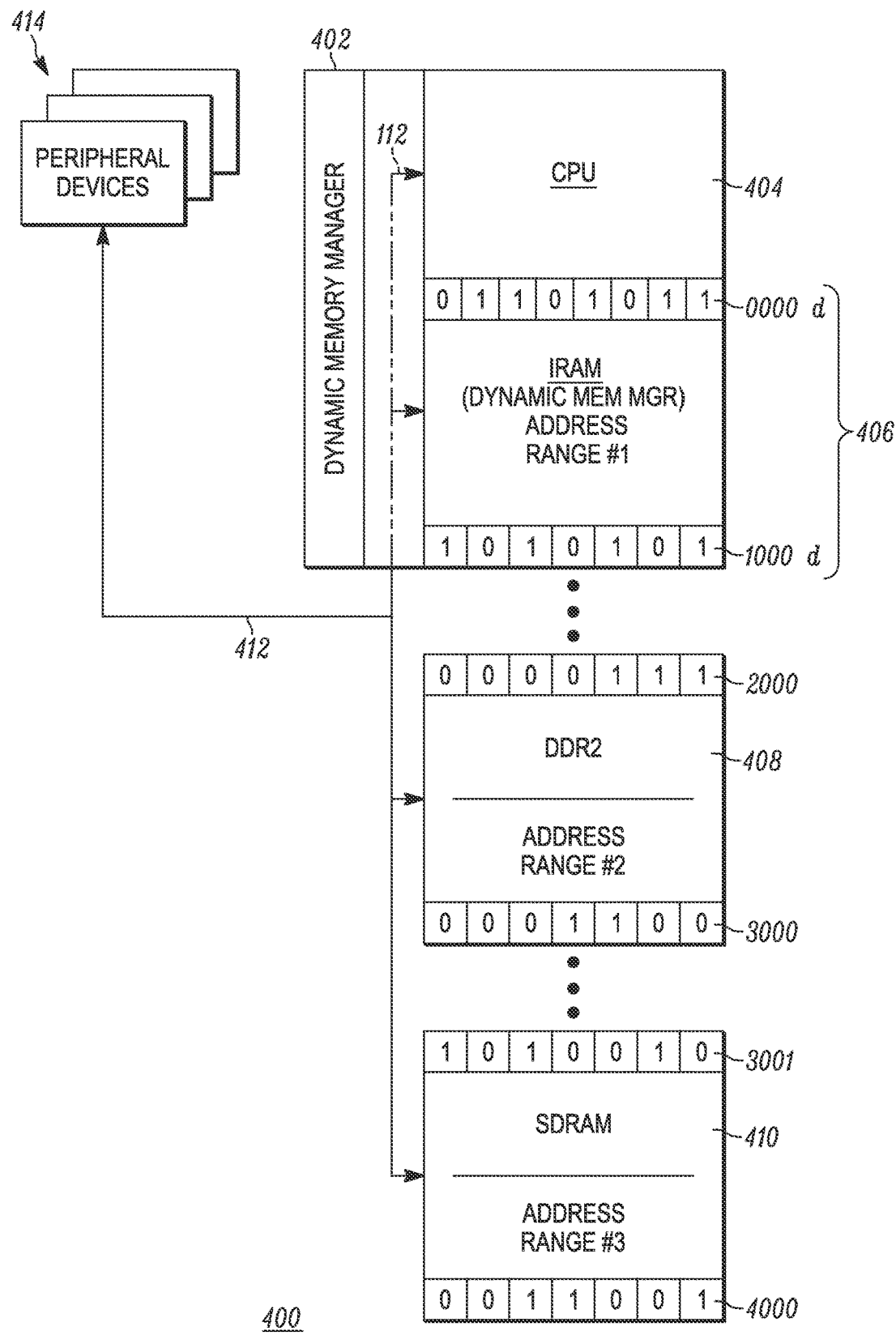
FIG. 4 is a block diagram of an embedded computer system having a dynamic memory manager.

FIG. 4 is a block diagram of an embedded computer system 400 configured with a dynamic memory manager 402 configured to perform the steps depicted in FIG. 3 and described above.

The dynamic memory manager 402, which can be implemented in software or hardware, is operatively coupled to the CPU 404 and memory devices 406, 408 and 410 via a conventional bus 412. Various peripheral devices 414 are also coupled to the CPU 404 via the bus 412.

Figure 5:
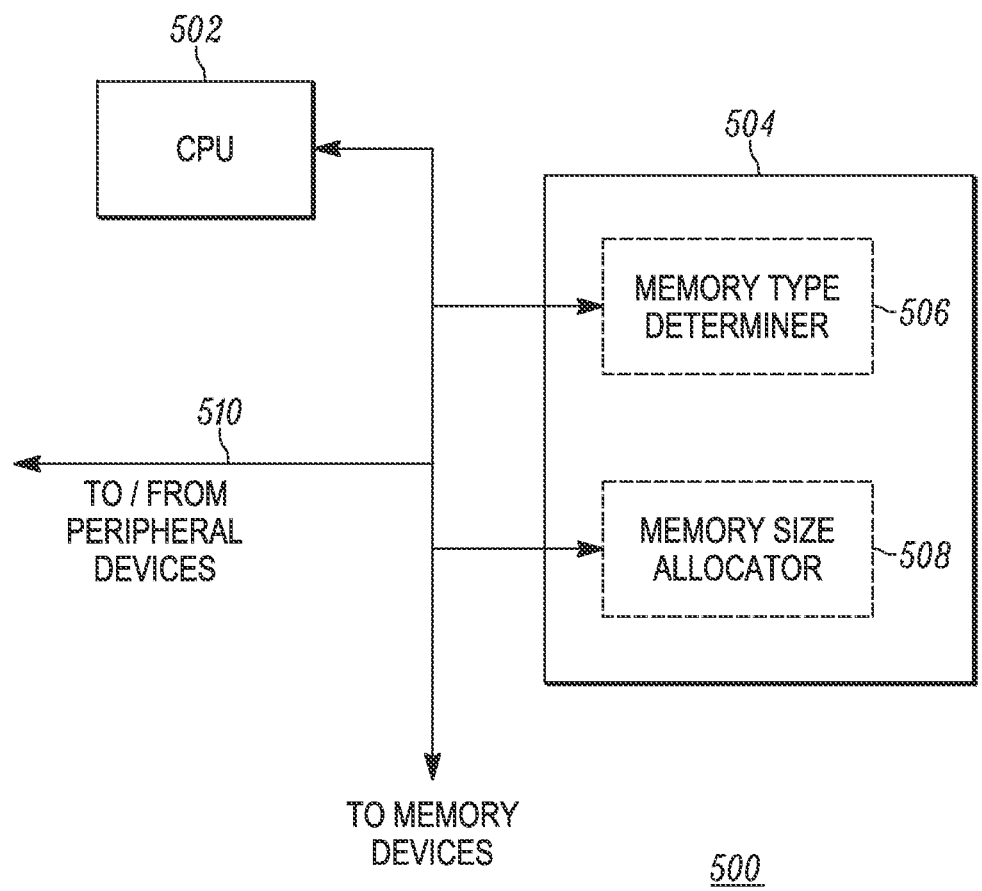
FIG. 5 is a block diagram of a dynamic memory manager.

FIG. 5 is a block diagram of a dynamic memory manager 500. A processor or CPU 502 is coupled to one or more non-transitory memory devices 504, such as the memory devices described above and which store program instructions 506, 508 that can be executed by the processor/CPU 502. When the instructions are executed, they cause the processor/CPU 502 to perform steps depicted in FIG. 3 and described above.

As used herein, a bus is considered to be a set of electrically-parallel conductors in a computer system that forms a transmission path for control signals, address information and data. In FIG. 5 a conventional address/data/control bus 502. The bus 510 enables the processor/CPU to communicate with various peripheral devices, omitted from FIG. 5 for simplicity.

The foregoing description is for illustration purposes. The true scope of the invention is set forth in the following claims.

The invention claimed is:

1. A method of allocating the data section of a real-time computer program to be executed by a processor of an embedded system, to a region of memory selected from a plurality of regions, located in a plurality of different types of available memory devices coupled to the processor, the plurality of different types of available memory devices including real-time-performance-critical memory, real-time-non-performance-critical memory that is slower than and costs less money than the real-time-performance-critical memory, and non-real-time-non-performance-critical memory that is slower than and costs less money than the real-time-non-performance-critical memory, the method comprising:

when the embedded system initiates execution of the real-time computer program:

determining, based on a memory type specified in a memory-allocation-function call in the real-time computer program, a requested type of real-time random access memory device to be used by the real-time computer program, wherein the memory type specified in the memory-allocation-function call in the real-time computer program is real-time-performance-critical memory when the real-time computer program requires processor-intensive computations, and the memory type specified in the memory-allocation-function call in the real-time computer program is real-time-non-performance-critical memory when the real-time computer program does not require processing-intensive computations;

determining, from an amount of memory space specified in the memory-allocation-function call in the real-time computer program, an amount of real-time memory space requested by the real-time computer program;

determining an amount of space available in the requested type of real-time random access memory devices, that can be allocated to use by the real-time computer program;

when the amount of memory space that can be allocated to the real-time computer program in the requested type of real-time random access memory devices is greater than or equal to the amount of memory space specified by the memory-allocation-function call in the real-time computer program, loading the real-time computer program into the requested type of real-time random access memory devices, and executing the real-time computer program using the data section from the requested type of real-time random access memory devices;

when the amount of memory space available in the requested type of real-time random access memory device is less than the amount of memory space specified by the memory-allocation-function call in the real-time computer program, determining the space available in a next-slower type of real-time random access memory devices for use by programs;

when the amount of memory space available in the next-slower type of random access memory devices is greater than or equal to the amount of memory space specified by the memory-allocation-function call in the real-time computer program, loading the real-time computer program into the next-slower type of random access memory devices, and executing the real-time computer program using the data section from the next-slower type of random access memory devices;

when there is an additional next-slower type of random access memory devices for use by programs and when the amount of memory space available in the additional next-slower type of random access memory devices is greater than or equal to the amount of memory space specified by the memory-allocation-function call in the real-time computer program, loading the real-time computer program into the additional next-slower type of random access memory devices, and executing the real-time computer program using the data section from the additional next-slower type of random access memory devices;

such that dynamically determining, upon initiating execution of the real-time computer program and based upon the memory type specified by the memory-allocation-function call in the real-time computer program, whether to use the data section from the next-slower type of random access memory devices and the additional next-slower type of random access memory devices to execute the real-time computer program: (1) efficiently shares the faster and more financially costly real-time-performance-critical random access memory device among performance critical real-time computer programs thereby reducing an amount of, and an associated financial cost of providing, the faster and more financially costly real-time-performance-critical random access memory device required by the embedded system for executing performance-critical real-time computer programs, (2) allows the real-time computer program to be executed using the data section from real-time-performance-non-critical random access memory devices when the amount of memory space available in the real-time-performance-critical random access memory device is less than the amount of memory space specified by the memory-allocation-function call in the real-time computer program, and (3) allows the real-time computer program to be executed using the data section from non-real-time-non-performance-critical random access memory devices when the amount of memory space available in the real-time-performance-critical random access memory device and the amount of memory space available in the real-time-non-performance-critical random access memory devices are both less than the amount of memory space specified by the memory-allocation-function call in the real-time computer program.

2. The method of claim 1, wherein the real-time-performance-critical random access memory is internal random access memory.

3. The method of claim 2, wherein the real-time-performance-non-critical random access memory is external random access memory.

4. The method of claim 3, wherein the internal random access memory is located on the same semiconductor die as the processor of the embedded system.

5. The method of claim 4, wherein the external random access memory is selected from the group consisting of: DDR1, DDR2, SDRAM, FLASH, and a hard disk drive.

6. The method of claim 5, wherein the embedded system is a vehicle infotainment system.

7. The method of claim 5, wherein the embedded system is a cellular telephone.

8. A dynamic memory manager configured to dynamically allocate memory to non-transitory memory devices, the memory manager comprising:
  a processor of an embedded system, the embedded system including a plurality of different types of available memory devices including real-time-performance-critical memory, real-time-non-performance-critical memory that is slower than and costs less money than the real-time-performance-critical memory, and non-real-time-non-performance-critical memory that is slower than and costs less money than the real-time-non-performance-critical memory; and
  a memory device coupled to the processor and storing program instructions, which when executed cause the processor to:
    when the embedded system initiates execution of a real-time computer program:
      determining, based on a memory type specified in a memory-allocation-function call in the real-time computer program, a requested type of real-time random access memory device to be used by the real-time computer program;
      determining, from an amount of memory space specified in the memory-allocation-function call in the real-time computer program, an amount of real-time memory space required by the real-time computer program, wherein the memory type specified in the memory-allocation-function call in the real-time computer program is real-time-performance-critical memory when the real-time computer program requires processor-intensive computations, and the memory type specified in the memory-allocation-function call in the real-time computer program is real-time-non-performance-critical memory when the real-time computer program does not require processing-intensive computations;
      determining an amount of space available in the requested type of real-time random access memory devices, that can be allocated to use by the real-time computer program;
      when the amount of memory space that can be allocated to the real-time computer program in the requested type of real-time random access memory devices is greater than or equal to the amount of memory space specified by the memory-allocation-function call in the real-time computer program, loading the real-time computer program into the requested type of real-time random access memory devices, and executing the real-time computer program using the data section from the requested type of real-time random access memory devices;
      when the amount of memory space available in the requested type of real-time random access memory devices is less than the amount of memory space specified by the memory-allocation-function call in the real-time computer program, determining the space available in a next-slower type of real-time random access memory devices for use by programs;
      when the amount of memory space available in the next-slower type of random access memory devices is greater than or equal to the amount of memory space required by the real-time computer program, loading the real-time computer program into the next-slower type of random access memory devices; and
      executing the real-time computer program using the data section from the next-slower type of random access memory devices;
    when there is an additional next-slower type of random access memory devices for use by programs and when the amount of memory space available in the additional next-slower type of random access memory devices is greater than or equal to the amount of memory space specified by the memory-allocation-function call in the real-time computer program, loading the real-time computer program into the additional next-slower type of random access memory devices, and executing the real-time computer program using the data section from the additional next-slower type of random access memory devices;
  such that dynamically determining, upon initiating execution of the real-time computer program and based upon the memory type specified by the memory-allocation-function call in the real-time computer program, whether to use the data section from the next-slower type of random access memory devices and the additional next-slower type of random access memory devices to execute the real-time computer program: (1) efficiently shares the faster and more financially costly real-time-performance-critical random access memory device among performance critical real-time computer programs thereby reducing an amount of, and an associated financial cost of providing, the faster and more financially costly real-time-performance-critical random access memory required by the embedded system for executing performance-critical real-time computer programs, (2) allows the real-time computer program to be executed using the data section from real-time-performance-non-critical random access memory devices when the amount of memory space available in the real-time-performance-critical random access memory device is less than the amount of memory space specified by the memory-allocation-function call in the real-time computer program, and (3) allows the real-time computer program to be executed using the data section from non-real-time-non-performance-critical random access memory devices when the amount of memory space available in the real-time-performance-critical random access memory device and the amount of memory space available in the real-time-non-performance-critical random access memory devices are both less than the amount of memory space specified by the memory-allocation-function call in the real-time computer program.

9. The dynamic memory manager of claim 8, wherein the real-time-performance-critical random access memory is internal random access memory.

10. The dynamic memory manager of claim 9, wherein the real-time-performance-non-critical random access memory is external random access memory.

11. The dynamic memory manager of claim 10, wherein the internal random access memory is located on the same semiconductor die as the processor of the embedded system.

12. The dynamic memory manager of claim 11, wherein the external random access memory is selected from the group consisting of: DDR1, DDR2, SDRAM, FLASH, and a hard disk drive.

13. The dynamic memory manager of claim 12, wherein the embedded system is a vehicle infotainment system.

14. The dynamic memory manager of claim 12, wherein the embedded system is a cellular telephone.

* * * * *